United States Patent
Onishi et al.

[11] Patent Number: 6,074,708
[45] Date of Patent: Jun. 13, 2000

[54] PHOTOINITIATOR PHOTOPOLYMERIZABLE RESIN COMPOSITION, POLYMER AND LIQUID CRYSTAL DISPLAY DEVICE

[75] Inventors: Noriaki Onishi, Nara; Aya Miyazaki, Tenri; Daisaku Matsunaga, Tokyo; Touru Ozaki, Saitama-ken, all of Japan

[73] Assignees: Sharp Kabushiki Kaisha, Osaka; Nippon Kayaku Co., Ltd., Tokyo, both of Japan

[21] Appl. No.: 09/217,187

[22] Filed: Dec. 22, 1998

[30] Foreign Application Priority Data

Dec. 22, 1997 [JP] Japan .................................. 9-353899

[51] Int. Cl.$^7$ .................... C09K 19/38; C09K 19/52; C08F 2/50; G02F 1/1333
[52] U.S. Cl. ................ 428/1.1; 428/1.2; 252/299.01; 252/299.4; 349/183; 522/183; 568/835; 430/923
[58] Field of Search .................. 252/299.01, 299.4, 252/299.5; 428/1.1, 1.2; 522/1, 183; 349/122, 127, 128, 129, 133, 135, 183; 568/607, 666, 670, 835; 430/923

[56] References Cited

U.S. PATENT DOCUMENTS 5,073,294 12/1991 Shannon et al. .................. 252/299.01
5,518,652 5/1996 Parri et al. ........................ 252/299.01

OTHER PUBLICATIONS

Caplus 1995:233204
Caplus 1992:184455
Caplus 1999:327102

*Primary Examiner*—Shean C. Wu
*Attorney, Agent, or Firm*—Nixon & Vanderhye P.C.

[57] ABSTRACT

A photoinitiator is represented by general formula (I):

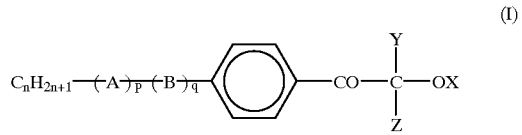

(I)

where n is an integer of 1 or greater; A and B are each a trans cyclohexane ring or a benzene ring, the benzene ring being allowed to include a fluorine atom or a methyl group as a substituent, the benzene ring adjacent to a carbonyl group being allowed to include a fluorine atom or a methyl group as a substituent; p and q are each 0 or 1, p and q are not simultaneously 0; X is an alkyl group of $C_1$ through $C_3$ or hydrogen atom, Y is a methyl group, ethyl group or alkoxy group of $C_1$ through $C_3$, and Z is a methyl group, ethyl group, alkyl-substituted phenyl group or a group represented by general formula (II), Y and Z being allowed to bonded together to form a ring:

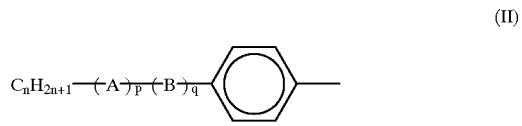

(II)

where A, B, n, p and q are identical with those in general formula (I).

46 Claims, 3 Drawing Sheets

FIG. 1A
FIG. 1B
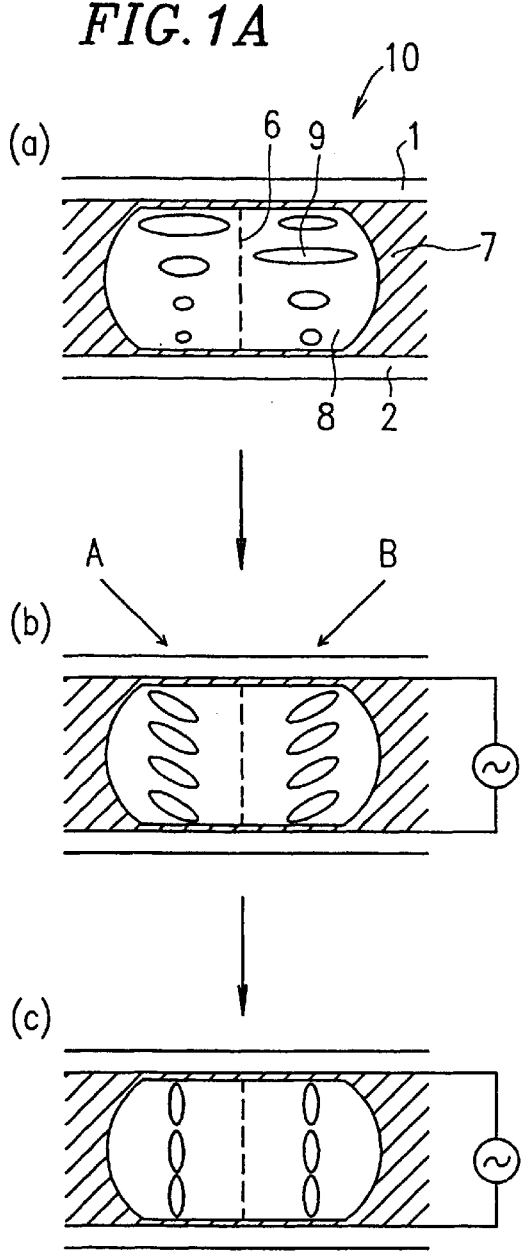
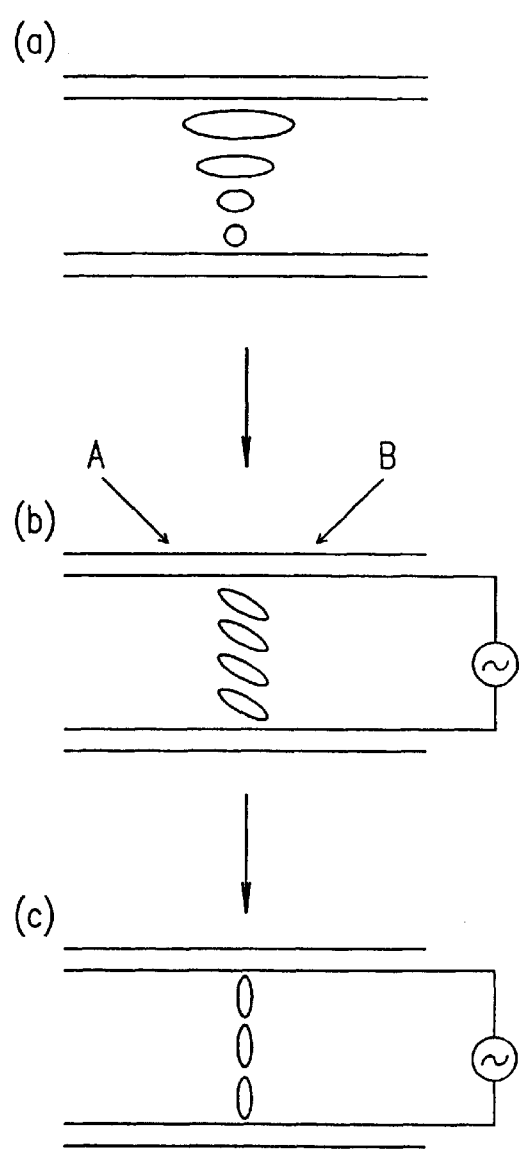

PHOTOINITIATOR PHOTOPOLYMERIZABLE RESIN COMPOSITION, POLYMER AND LIQUID CRYSTAL DISPLAY DEVICE

BACKGROUND OF THE INVENTION

1. Field of the Invention

The present invention relates to a liquid crystal device used by a single person or a plurality of people, such as a wordprocessor, a personal computer, or a mobile information terminal, a photoinitiator suitable for such a liquid crystal display device, a photopolymerizable resin composition containing such a photoinitiator, and a polymer formed from such a composition. In this specification, a liquid crystal display device will be referred to as an "LCD device".

2. Description of the Related Art

Conventionally, the following LCD devices using a composite of a liquid crystal material and a polymer are known.

Japanese National Phase PCT Laid-Open Publication No. 58-501631, for example, describes a polymer dispersed liquid crystal display device (hereinafter, referred to as a "PDLC display device"). The PDLC display device includes liquid crystal domains each surrounded by a polymer matrix. When no voltage is applied to the liquid crystal material, the refractive indices of the liquid crystal material and the polymer are not matched, resulting in a scattering state. When a voltage is applied to the liquid crystal material, the refractive index of the liquid crystal material changes so as to be matched with that of the polymer, resulting in a transparent state.

Japanese National Phase PCT Laid-Open Publication No. 61-502128, for example, describes an LCD device in which a mixture of the liquid crystal material and the photopolymerizable resin is irradiated with ultraviolet rays, resulting in three-dimensional phase separation into the liquid crystal material and a polymer.

The above-described LCD devices perform display by electrically controlling the liquid crystal material to be in the scattering state or the transparent state. The liquid crystal domains do not have any spatial regularity.

In order to provide a regularity to liquid crystal domains formed by irradiating a mixture of a liquid crystal material and a photopolymerizable resin with ultraviolet rays, methods of irradiation of ultraviolet rays through a photomask as described below have been disclosed.

Japanese Laid-Open Publication No. 1-269922 describes the following method. A mixture of a liquid crystal material and a photopolymerizable resin is subjected to a first exposure to light through a photomask. After the photomask is removed, the mixture is subjected to a second exposure with ultraviolet rays, so that an area covered by the photomask during the first exposure is irradiated with ultraviolet rays. Thus, areas having different electrooptical characteristics are formed. An LCD device produced by this method basically performs in a scattering mode.

Japanese Laid-Open Publication No. 5-257135 describes an LCD device produced by the following method. An alignment layer having an alignment restricting force is provided on each of two substrates. Into a gap between the two substrates, a mixture of a liquid crystal material and a photopolymerizable resin is injected. The mixture of the liquid crystal material and the photopolymerizable resin is irradiated with ultraviolet rays through a photomask. The LCD device produced by this method is used for static driving, by which liquid crystal domains are patterned by a control performed outside the cell, utilizing that an area covered by the photomask and an area not covered by the photomask have different threshold characteristics.

As an attempt to improve the viewing angle characteristic of the LCD devices, use of a composite of a liquid crystal material and a polymer has been proposed. It is necessary that liquid crystal molecules are oriented in at least three directions in a pixel area in order to improve the viewing angle characteristic.

With reference to FIGS. 1A and 1B, the viewing angle characteristic of a wide viewing angle mode LCD device will be described.

FIG. 1A schematically shows the relationship between a change in the orientation of liquid crystal molecules and the viewing angle characteristic in accordance with application of a voltage regarding a wide viewing angle mode LCD device 10. FIG. 1B schematically shows such relationship regarding a conventional twisted nematic (TN) mode LCD device. In both FIGS. 1A and 1B, part (a) illustrates the state where no voltage is applied, part (b) illustrates an intermediate state where a voltage is applied to a certain degree less than full, and part (c) illustrates the state where the voltage is applied to a full degree.

As shown in FIG. 1A, the LCD device 10 includes plates 1 and 2. A liquid crystal layer interposed between the plates 1 and 2 includes a polymer wall 7 surrounding a liquid crystal domain 8. Liquid crystal molecules 9 included in the liquid crystal domain 8 are oriented symmetrically with respect to an axis 6. Accordingly, in the intermediate state shown in part (b), the apparent refractive indices of the liquid crystal molecules 9 when seen in directions A and B are averaged to be equal. As a result, the viewing angle characteristic is improved compared to the TN mode shown in FIG. 1B.

In the conventional TN mode LCD device shown in FIG. 1B, the liquid crystal molecules have only one orientation direction in the intermediate state shown in part (b). Accordingly, display characteristics such as the levels of brightness and the apparent refractive indices of the liquid crystal molecules when seen in directions A and B are different. As a result, the viewing angle characteristic is inferior to that of the LCD device 10.

The following LCD devices have been disclosed as wide viewing angle mode LCD devices.

Japanese Laid-Open Publication Nos. 4-338923 and 4-212928 disclose a wide viewing angle mode LCD apparatus produced by combining the above-described PDLC display device and polarizers having polarizing axes perpendicular to each other.

Japanese Laid-Open Publication No. 5-27242 discloses a method for improving the viewing angle characteristic of a non-scattering mode LCD display device using polarizers. According to the method, a mixture of a liquid crystal material and a photopolymerizable resin is phase-separated, thereby forming a liquid crystal layer formed of a composite of the liquid crystal material and a polymer. Due to such a method, the orientation of liquid crystal domains become random by the resultant polymer. In other words, the liquid crystal molecules in different domains rise in different orientation directions when a voltage is applied. As a result, the transmittance of the liquid crystal molecules becomes equal when seen in a plurality of directions, thus improving the viewing angle characteristic in a half-tone display.

The present inventors disclose the following LCD device in Japanese Laid-Open Publication No. 6-301015. The LCD device is produced by controlling the amount of light using a photomask or the like during photopolymerization, so that the liquid crystal molecules are oriented in an axially symmetrical state in a pixel area (e.g., spiral orientation). The liquid crystal molecules oriented in the axially symmetrical state are voltage-controlled to open and close in a manner to give the impression of an umbrella opening and closing. Thus, the viewing angle characteristic is significantly improved.

For producing an LCD device including a polymer wall formed by irradiating a mixture of a liquid crystal material and a photopolymerizable resin with light, Irgacure651 or Irgacure184 (produced by Ciba-Geigy Corporation) has been conventionally used as a photoinitiator.

A photoinitiator is indispensable to polymerize (i.e., cure) the above-described photopolymerizable resin. A generally used photoinitiator functions in the following manner. Molecules of the photoinitiator are cleaved by light irradiation to be radicals, which causes radical polymerization reaction with a photopolymerizable resin (monomer). Thus, the photopolymerizable resin is polymerized (i.e., cured).

However, the above-described photoinitiators have a relatively small molecular weight and are relatively highly volatile. In the case where a mixture of a liquid crystal material, a photopolymerizable resin and such a photoinitiator is pressure-reduced and defoamed and then injected into a liquid crystal panel, the photoinitiator is significantly vaporized by the pressure-reduction and thus polymerization reaction does not proceed sufficiently. As a result, the following disadvantages are generated. The display characteristics of the resultant LCD device are deteriorated. The voltage retaining ratio of the LCD device is reduced, the specific resistance of the mixture of the liquid crystal material, the photopolymerizable resin and the photoinitiator is lowered, and images unnecessarily remain on the screen, resulting in deterioration in the display quality.

In the following type of LCD devices, photopolymerization is performed in order to control the orientation of the liquid crystal molecules: (1) an LCD device in which the wide viewing angle is realized by controlling the orientation of the liquid crystal molecules in a pixel area; and (2) an LCD device including liquid crystal domains substantially surrounded by a polymer wall, in which the orientation of the liquid crystal molecules is changed in correspondence with an externally applied voltage, and a change in the polarization state of transmitted light caused by the change in the orientation is utilized for display (e.g., TN, STN (super twisted nematic), ECB (electrically controlled birefringence), FLC (ferroelectric liquid crystal), and axially symmetrical orientation mode LCD devices). Accordingly, in the case when a polymerization system contains impurities or when a reactive substance or photoinitiator which is likely to disturb the orientation of the liquid crystal molecules remains in the liquid crystal layer, undesirable display is likely to occur.

SUMMARY OF THE INVENTION

According to one aspect of the invention, a photoinitiator is represented by general formula (I):

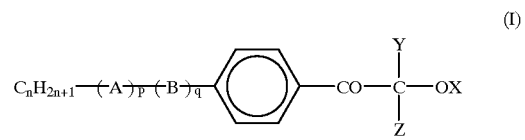

where n is an integer of 1 or greater; A and B are each a trans cyclohexane ring or a benzene ring, the benzene ring being allowed to include a fluorine atom or a methyl group as a substituent, the benzene ring adjacent to a carbonyl group being allowed to include a fluorine atom or a methyl group as a substituent; p and q are each 0 or 1 and are not simultaneously 0; X is an alkyl group of $C_1$ through $C_3$ or hydrogen atom, Y is a methyl group, ethyl group or alkoxy group of $C_1$ through $C_3$, and Z is a methyl group, ethyl group, alkyl-substituted phenyl group or a group represented by general formula (II), Y and Z being allowed to bonded together to form a ring:

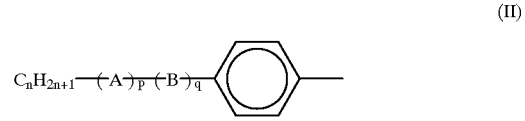

where A, B, n, p and q are identical with those in general formula (I).

In one embodiment of the invention, p is 1 in general formulas (I) and (II).

In one embodiment of the invention, p and q are each 1 in general formulas (I) and (II).

In one embodiment of the invention, A and B are each a trans cyclohexane in general formulas (I) and (II).

In one embodiment of the invention, p is 1, q is 0, and A and B are each a trans cyclohexane in general formulas (I) and (II).

According to another aspect of the invention, a photoinitiator is represented by general formula (III):

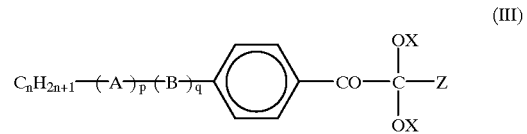

where n is an integer of 1 or greater; A and B are each a trans cyclohexane ring or a benzene ring, the benzene ring being allowed to include a fluorine atom or a methyl group as a substituent, the benzene ring adjacent to a carbonyl group being allowed to include a fluorine atom or a methyl group as a substituent; p and q are each 0 or 1 and are not simultaneously 0; X is an alkyl group of $C_1$ through $C_3$, and Z is an alkyl-substituted phenyl group or a group represented by general formula (IV):

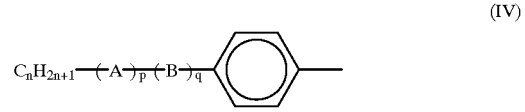

where A, B, n, p and q are identical with those in general formula (III).

In one embodiment of the invention, p is 1 in general formulas (III) and (IV).

In one embodiment of the invention, p and q are each 1 in general formulas (III) and (IV).

In one embodiment of the invention, A and B are each a trans cyclohexane in general formulas (III) and (IV).

In one embodiment of the invention, p is 1, q is 0, and A and B are each a trans cyclohexane in general formulas (III) and (IV).

In one embodiment of the invention, X is a hydrogen atom, and Y and Z are each a methyl group or ethyl group or Y and Z are allowed to be bonded together to form a ring in general formula (I).

In one embodiment of the invention, n is an integer of 3 or more and 7 or less and X is a methyl group in general formulas (III) and (IV).

In one embodiment of the invention, Z is a group represented by general formula (IV) and X is a methyl group in general formula (III), and n is an integer of 3 or more and 7 or less in general formula (IV).

In one embodiment of the invention, n is an integer of 3 or more and 7 or less, X is a hydrogen atom, and Y and Z are bonded together to form a cyclohexane ring in general formula (I).

In one embodiment of the invention, n is 3, 5 or 7 in general formulas (III) and (IV).

In one embodiment of the invention, n is 3, 5 or 7 in general formula (I).

According to still another aspect of the invention, a photopolymerizable resin composition includes at least one photoinitiator described above; and a photopolymerizable resin having a polymerizable functional group.

According to still another aspect of the invention, a photopolymerizable resin composition includes at least one photoinitiator described above; and a photopolymerizable resin having a polymerizable functional group.

In one embodiment of the invention, the photoinitiator is contained in an amount of 0.3 wt. % to 40 wt. % based on a weight of the photopolymerizable resin.

According to still another aspect of the invention, a polymer is produced by photopolymerization of a photopolymerizable resin composition described above.

According to still another aspect of the invention, a liquid crystal display device includes a pair of plates; and a polymer wall and liquid crystal domains surrounded by the polymer wall, the polymer wall and the liquid crystal domains being interposed between the pair of plates. The polymer wall includes a polymer described above.

In one embodiment of the invention, liquid crystal molecules in the liquid crystal domains are allowed to be oriented in an axially symmetric state.

In one embodiment of the invention, the liquid crystal domains are arranged regularly.

In one embodiment of the invention, a liquid crystal display device further includes a liquid crystal alignment layer provided on a surface of at least one of the plates, the surface facing the liquid crystal domains.

In one embodiment of the invention, liquid crystal molecules in the liquid crystal domains are oriented in one of a twisted nematic manner, a super twisted nematic manner, an electrically controlled birefringence manner, and a ferroelectric liquid crystal manner.

In one embodiment of the invention, the liquid crystal domains are each provided for one pixel area which is a minimum unit for display.

According to the present invention, a photoinitiator is incorporated into a polymer as a result of a photopolymerization reaction of a photopolymerizable resin, and thus is put into contact with liquid crystal domains, in addition to having a function of a photoinitiator. Since the photoinitiator according to the present invention includes a liquid crystal-like structure introduced into molecules thereof, the orientation of liquid crystal molecules is prevented from being disturbed. Moreover, due to the liquid crystal-like structure, the photoinitiator according to the present invention has an increased molecular weight and thus is unlikely to be vaporized during pressure reduction conducted for injecting a mixture of a liquid crystal material, a photopolymerizable resin and the photoinitiator into a liquid crystal panel. The problems caused by the vaporization of the photoinitiator are solved.

Thus, the invention described herein makes possible the advantages of (1) providing a photoinitiator for improving the display characteristics of a liquid crystal panel, such as the display uniformity, response speed and voltage retaining ratio and also improving the pressure tightness of the liquid crystal panel; (2) a photopolymerizable resin composition containing such a photoinitiator; (3) a polymer formed from such a composition; and (4) an LCD device including such a polymer.

These and other advantages of the present invention will become apparent to those skilled in the art upon reading and understanding the following detailed description with reference to the accompanying figures.

BRIEF DESCRIPTION OF THE DRAWINGS

FIGS. 1A and 1B respectively shows schematic cross-sectional views of an LCD device according to the present invention and a conventional LCD device, illustrating the relationship between a change in the orientation of liquid crystal molecules and the viewing angle characteristic in accordance with application of a voltage;

Figure 2:
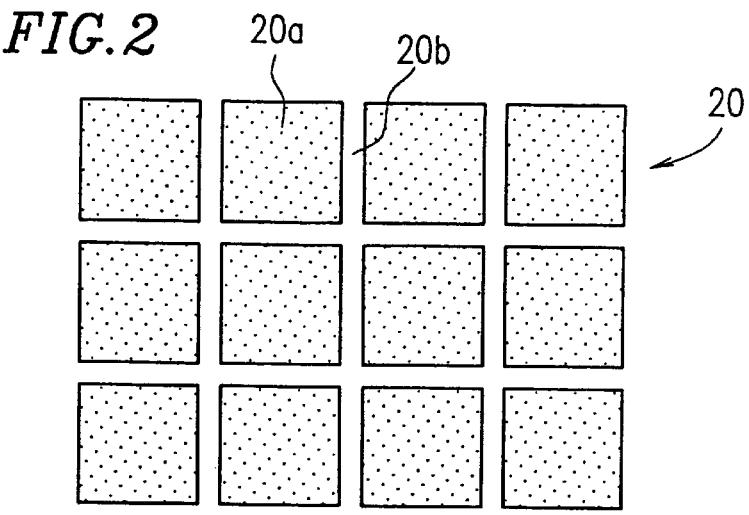
FIG. 2 is a schematic plan view of a photomask usable for forming an LCD device according to the present invention.

DESCRIPTION OF THE PREFERRED EMBODIMENTS (Structure of the photoinitiator)

The present inventors conducted active studies on a structure of a photoinitiator which is usable for controlling the orientation of the liquid crystal molecules in a liquid crystal layer formed of a composite of a liquid crystal material and a polymer, and also has a sufficiently high resistance against pressure reduction and thus is unlikely to cause a composition change of a mixture containing a liquid crystal material, a photopolymerizable resin and the photoinitiator when the mixture is injected into a liquid crystal panel. As a result, the present inventors have achieved a photoinitiator containing a liquid crystal-like structure in a molecule thereof.

In order to prepare a highly pressure reduction-resistant polymerization system for maintaining the orientation of the liquid crystal molecules surrounded by the polymer wall, it is very effective to introduce a liquid crystal-like structure into molecules of a photoinitiator which has a low molecular weight, is highly volatile and is excited by a light energy so that the molecules thereof are cleaved (i.e., light-reacted).

The introduction of a liquid crystal-like structure allows for an increase in the molecular weight of the photoinitiator so as to raise the resistance against pressure reduction and further, when the photoinitiator is in contact with the liquid crystal molecules, allows the orientation of the liquid crystal molecules to be maintained.

Generally, photoinitiators mostly have a structure in which a carbonyl group (C=O) is directly bonded to a benzene ring such as Irgacure651 (benzyl dimethyl ketal; produced by Ciba-Geigy Corporation) represented by formula (V) and Irgacure184 (α-hydroxyalkylphenone; produced by Ciba-Geigy Corporation) represented by formula (VI). It is known that the carbonyl carbon is α-cleaved by light irradiation to generate active radicals, which are involved in polymerization with a photopolymerizable monomer.

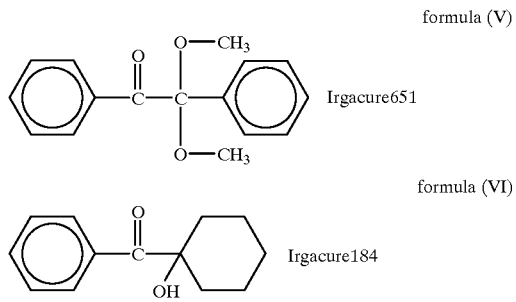

An exemplary liquid crystal-like structure to be introduced into a molecule of a photoinitiator, according to the present invention, is a unit having a structure similar to the core structure of a liquid crystal molecule. The unit is formed by combining one or two types of either one or both of a benzene ring and a trans cyclohexane ring, which are cyclic functional groups, and directly bonding the resultant substance to 4-position of a benzene ring adjacent to the carbonyl group (C=O) which is to be cleaved by light irradiation. When such a unit is introduced into a molecule of the photoinitiator, the unit can be introduced to one or both of cleavage ends $R_1$ and $R_2$ of the molecule of the photoinitiator represented by expression (A).

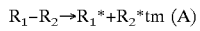

One exemplary photoinitiator having the above-described liquid crystal-like structure is represented by general formula (I).

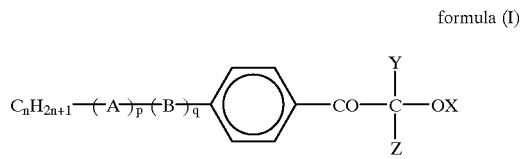

In general formula (I), n is an integer of 1 or greater, which is preferably 1 through 9 and more preferably 3 through 7. When n is greater than 10, the transition temperature may be undesirably lowered. In the case where the amount of the photoinitiator is sufficiently small, n can be greater than 10 since the influence of the photoinitiator is insignificant.

A and B are each a trans cyclohexane ring or a benzene ring. The benzene ring can include a fluorine atom or a methyl group as a substituent. The cyclic functional group which is directly bonded to the benzene ring adjacent to the carbonyl group which is to be cleaved by light irradiation is preferably formed of a saturated hydrocarbon such as, for example, a trans cyclohexane ring having a structure which does not delocalize (i.e., stabilize) π electrons. The reason is that such a saturated hydrocarbon allows for a higher polymerization reactivity by activation of the radicals. In the case where a group for delocalizing the π electrons such as, for example, a benzene ring, is introduced, the polymerization reactivity is lowered but a side reaction in the reaction system is desirably controlled by improving the selectivity of polymerization reaction.

The benzene ring adjacent to the carbonyl group can include a fluorine atom or a methyl group as a substituent.

The benzene ring adjacent to A, B or the carbonyl group is preferably bonded by a 1,4-bond.

In general formula (I), p and q are 0 or 1. However, p and q are never 0 at the same time. It is possible that p is 1 and q is 0; p is 1 and q is 1; and q is 0 and p is 1. The ranges for p and q are set in this manner since the solubility of these substances in a liquid crystal material is lowered when $p+q \geq 3$.

X is an alkyl group of $C_1$ through $C_3$ or hydrogen atom Y is a methyl group, ethyl group or alkoxy group of $C_1$ through $C_3$. Z is a methyl group, ethyl group, alkyl substituted-phenyl group or a group represented by general formula (II), infra. Y and Z can be bonded together to form a ring.

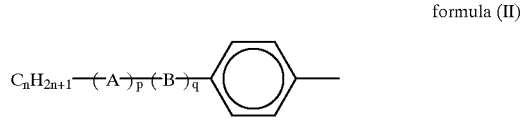

In general formula (II), A, B, n, p and q are the same as above.

When Y and Z are each a long-chain alkyl group in general formula (I), Y and Z are preferably each a methyl group or an ethyl group or bonded together to form a ring. Otherwise, the transition temperature may be undesirably lowered or the reactivity of the photoinitiator may undesirably lowered. It is especially preferable that Y and Z are both methyl groups or bonded together to form a cyclohexane ring.

In general formula (I), X is preferable in the following order from the viewpoint of the reaction rate of the photoinitiator.

Accordingly, X is preferably a methyl group, ethyl group or hydrogen atom, and more preferably a methyl group.

Another exemplary photoinitiator having the above-described liquid crystal-like structure is represented by general formula (III):

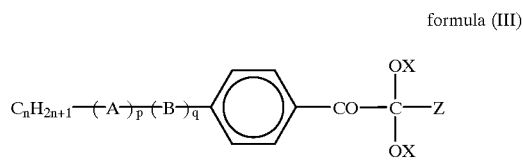

In general formula (III), n is an integer of 1 or greater, which is preferably 1 through 9 and more preferably 3 through 7. When n is greater than 10, the transition temperature may be undesirably lowered. In the case where the amount of the photoinitiator is sufficiently small, n can be greater than 10 since the influence of the photoinitiator is insignificant.

A and B are each a trans cyclohexane ring or a benzene ring. The benzene ring can include a fluorine atom or a methyl group as a substituent. The cyclic functional group which is directly bonded to the benzene ring adjacent to the carbonyl group which is to be cleaved by light irradiation is preferably formed of a saturated hydrocarbon such as, for example, a trans cyclohexane ring having a structure which does not delocalize $\pi$ electrons. The reason is that such a saturated hydrocarbon allows for a higher polymerization reactivity by activation of the radicals. In the case where a group for stabilizing the $\pi$ electrons such as, for example, a benzene ring, is introduced, the polymerization reactivity is lowered but a side reaction in the reaction system is desirably controlled by improving the selectivity of polymerization reaction.

The benzene ring adjacent to a carbonyl group can include a fluorine atom or a methyl group as a substituent.

The benzene ring adjacent to A, B or the carbonyl group is preferably bonded by a 1,4-bond.

In general formula (III), p and q is 0 or 1. However, p and q are never 0 at the same time. It is possible that p is 1 and q is 0; p is 1 and q is 1; and q is 0 and p is 1. The ranges for p and q are set in this manner since the solubility of these substances in a liquid crystal material is lowered when $p+q \geq 3$.

X is an alkyl group of $C_1$ through $C_3$. Z is an alkyl substituted-phenyl group or a group represented by general formula (IV), infra.

formula (IV)

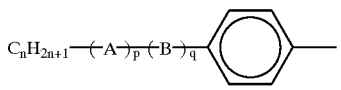

In general formula (IV), A, B, n, p and q are the same as above.

In general formula (III), X is preferable in the following order from the viewpoint of the reaction rate of the photoinitiator.

Accordingly, X is preferably a methyl group or ethyl group, and more preferably a methyl group. When X is a hydrogen atom in general formula (III), the photoinitiator cannot exist stably and is decomposed to be ketone.

In general formula (III), Z preferably has a structure represented by general formula (IV) for the following reason. When Z has a structure represented by general formula (IV), the resultant compound has a low vapor pressure and has a liquid crystallinity. Accordingly, the display characteristics of the resultant liquid crystal panel are improved.

As described above, a photoinitiator containing a liquid crystal-like structure introduced into molecules thereof has a relatively increased molecular weight. Furthermore, the apparent vapor pressure of the photoinitiator is reduced to make the photoinitiator less volatile. As a result, the composition change caused by, for example, vaporization of the mixture of the liquid crystal material, the photopolymerizable resin and the photoinitiator, which has been a problem occurring when the mixture is injected into the liquid crystal panel, is restricted or prevented.

The above-described photoinitiators can be used independently or in combination of two or more.

(Photopolymerizable resin composition)

A photopolymerizable resin composition according to the present invention contains at least one photoinitiator according to the present invention and a photopolymerizable resin having a polymerizable functional group.

Selection of a photopolymerizable resin to be mixed with a photoinitiator to form a photopolymerizable resin composition is important since the photopolymerizable resin is formed into a wall for supporting a pair of substrates and liquid crystal domains as a result of being mixed with a liquid crystal material. Usable photopolymerizable resins according to the present invention include, for example, photocurable resin monomers. Photocurable resin monomers include, for example, acrylic acids or acrylates having a long-chain alkyl group of $C_3$ or more or aromatic group. Photocurable resin monomers further include isobutyl acrylate, stearyl acrylate, lauryl acrylate, isoamyl acrylate, n-butyl methacrylate, n-lauryl methacrylate, tridecyl methacrylate, 2-ethylhexyl acrylate, n-stearyl methacrylate, cyclohexyl methacrylate, benzyl methacrylate, and 2-phenoxyethyl methacrylate.

In order to improve the physical strength of the polymer, multi-functional resins having two or more functionalities, for example, the resins listed below are also usable: bisphenol A dimethacrylate, bisphenol A diacrylate, 1,4-butanediol methacrylate, 1,6-hexanediol dimethacrylate, trimethylolpropane triacrylate, and tetramethylolmethane tetraacrylate.

Resins produced by halogenating, specifically chlorinating or fluorinating the above-described monomers are also usable. Such resins include, for example, 2,2,3,4,4,4-hexafluorobutyl methacrylate, 2,2,3,4,4,4-hexachlorobutyl methacrylate, 2,2,3,3-tetrafluoropropyl methacrylate, 2,2,3,3-tetrachloropropyl methacrylate, perfluorooctylethyl methacrylate, perchlorooctylethyl methacrylate, perfluorooctylethyl acrylate, and perchlorooctylethyl acrylate.

The above-described photopolymerizable resins can be used independently or in combination of two or more. The above-described monomers can be mixed with chlorinated or fluorinated polymers or oligomers, as necessary.

A photoinitiator according to the present invention is preferably added in an amount of 0.3 wt. % or more and 40 wt. % or less, and more preferably in an amount of 0.5 wt. % or more and 30 wt. % or less, based on a weight of such a photopolymerizable resin.

When the photoinitiator is added in an amount of less than 0.3 wt. %, the polymerization reaction of the photopolymerizable resin composition is unlikely to proceed efficiently, resulting in photopolymerizable resin composition partially remaining unreacted. As a consequence, the resultant polymer does not maintain sufficiently high characteristics or strength, and the performance of the resultant liquid crystal panel is significantly deteriorated.

When the photoinitiator is added in an amount of more than 40 wt. %, a very large amount of photoinitiator remains unreacted in the polymer after the polymerization reaction of the photopolymerizable resin composition is completed. As a consequence, the voltage retaining ratio and the display characteristics of the resultant liquid crystal panel are significantly deteriorated.

(Polymer)

A mixture of a photopolymerizable resin composition according to the present invention and a liquid crystal material is injected into a liquid crystal panel and irradiated with light. Thus, a liquid crystal layer having liquid crystal domains each surrounded by a polymer wall is formed. Such a mixture is usable as, for example, a panel seal resin used during production of a liquid crystal panel or after a liquid crystal material is injected.

A photoinitiator according to the present invention contains a liquid crystal-like structure in molecules, and has a larger molecular weight than that of the conventional photoinitiator. Such a photoinitiator according to the present invention has been confirmed to be effective since an area of the polymer wall obtained by the photopolymerization which is in direct contact with the liquid crystal material contributes to improvement of orientation stability and chemical stability of the liquid crystal molecules.

(Liquid crystal domains)

Usable liquid crystal materials forming liquid crystal domains according to the present invention are organic mixtures exhibiting a liquid crystal state at room temperature and the vicinity thereof, and include, for example, nematic liquid crystal materials (two-frequency driving liquid crystal materials; including liquid crystal materials of $\Delta\epsilon<0$), cholesteric liquid crystal materials (specifically, liquid crystal materials having a selective reflection characteristic with respect to visible light), smectic liquid crystal materials, ferroelectric liquid crystal materials (SmC*), and discotic liquid crystal materials. These liquid crystal materials can be mixed together. Specifically, nematic liquid crystal materials or nematic liquid crystal materials mixed with cholesteric liquid crystal materials are preferable. Liquid crystal materials having a sufficient resistance against chemical reaction are more preferable since treatment of the liquid crystal materials accompanies photopolymerization reaction. Liquid crystal materials having a sufficient resistance against chemical reaction have a functional group such as a fluorine atom; for example, ZLI-4801-000, ZLI-4801-001 and ZLI-4792 (produced by Merck & Co. Inc.).

In the liquid crystal domains, the liquid crystal molecules can be oriented in either one of a TN manner, STN manner, ECB manner or FLC manner. These orientation states are obtained by, for example, providing an alignment layer on a surface of at least one of a pair of substrates, the surface facing the liquid crystal domains. The liquid crystal molecules can be oriented in an axially symmetrical state by irradiating the molecules with light under appropriate conditions. Alternatively, using appropriate light irradiation conditions, the liquid crystal domains can be oriented regularly so that, for example, a liquid crystal domain is formed on a pixel area-by-pixel area basis. The pixel area is a minimum unit for performing display.

(Driving method)

An LCD device according to the present invention can be driven in various methods including simple matrix driving, plasma address driving, or active matrix driving using switching devices such as a-Si (amorphous silicon) TFTs, p-Si (polycrystalline silicon) TFTS, or MIM (metal-insulator-metal) device.

Hereinafter, the present invention will be described by way of illustrative, non-limiting examples with reference to the accompanying drawings.

SYNTHESIS EXAMPLE 1

Synthesis of Photoinitiator MPL-957 Having a Structure Represented by Formula (VII)

(1-a) Synthesis of 4,4'-bis(trans-4"-propylcyclohexyl-1")benzyl

First, 253 parts of carbon disulfide, 20.2 parts of trans-1-propyl-4-phenylcyclohexane (produced by Kanto Kagaku Kabushiki Kaisha), and 20 parts of anhydrous aluminum chloride are mixed together. While cooling the mixture with iced water, 6.35 parts of oxalyl dichloride is dropped to the mixture at 5° C. or less over about 30 minutes. After the resultant mixture is stirred at 5° C. or less for 2 hours and then at 15° C. to 20° C. for another 3 hours, the reaction mixture is put into 300 parts of iced water and decomposed. Then, the carbon disulfide layer is separated and washed with water 3 times. Then, carbon disulfide is distilled off. Thus, crude 4,4'-bis(trans-4"-propylcyclohexyl-1")benzyl is obtained. Thereafter, purified 4,4'-bis(trans-4"-propylcyclohexyl-1")benzyl is obtained by recrystallization from cyclohexane.

(1-b) Synthesis of MPL-957

First, 4.6 parts of 4,4'-bis(trans-4"-propylcyclohexyl-1")benzyl obtained in (1-a), 50 parts of toluene, 1 part of N,N'-dimethylpropylene urea, and 2.2 parts of dimethyl sulfate are mixed together. Then, 1.9 parts of sodium methylate is added to the mixture at 15° C. to 25° C. over 1 hour. After the resultant mixture is stirred at the same temperature for another 1.5 hours, 20 parts of water is added and stirred for 1 hour. Next, the toluene layer is separated and the toluene solution is treated by silica gel column chromatography, thereby taking out the target MPL-957. Thereafter, purified MPL-957 is obtained by recrystallization from the cyclohexane (melting point: 95° C. to 96° C.; NI point: 102° C.).

SYNTHESIS EXAMPLE 2

Synthesis of Photoinitiator MPL-953 Having a Structure Represented by Formula (VIII)

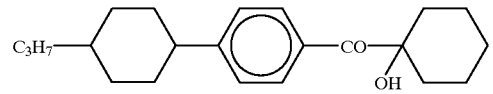

formula (VIII)

(2-a) Synthesis of 1-(trans-4'-propylcyclohexyl-1')-4-cyclohexyl carbonyl benzene First, 127 parts of carbon disulfide, 10.1 parts of trans-1-propyl-4-phenylcyclohexane (produced by Kanto Kagaku Kabushiki Kaisha), and 8.4 parts of anhydrous aluminum chloride are mixed together. While cooling the mixture with iced water, 8.1 parts of cyclohexane carbonyl chloride is dropped to the mixture at 5° C. or less. After the resultant mixture is stirred at 5° C. or less for 2 hours and then at 15° C. to 20° C. for another 2 hours, the reaction mixture is put into 100 parts of iced water and decomposed. Then, the carbon disulfide layer is separated and washed with water 3 times. Then, carbon disulfide is distilled off. Thus, crude 1-(trans-4'-propylcyclohexyl- 1')-4-cyclohexyl carbonyl benzene is obtained.

formula (VII)

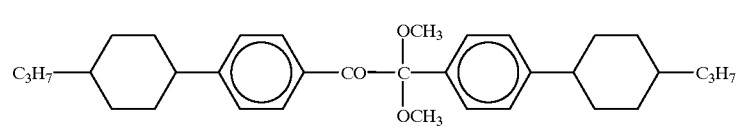

(2-b) Synthesis of 1-(trans-4'-propylcyclohexyl-1')-4-(1"-bromo)cyclohexyl carbonyl benzene First, 16.2 parts of 1-(trans-4'-propylcyclohexyl-1')-4-cyclohexyl carbonyl benzene obtained in (2-a) is dissolved in 120 parts of carbon tetrachloride. While cooling the mixture with iced water, 8 parts of bromine is dropped to the mixture at 5° C. or less. After the resultant mixture is stirred at 15° C. to 20° C. for 2 hours and hydrogen bromide is removed by aeration, carbon tetrachloride is removed by distillation, thereby obtaining 1-(trans-4'-propylcyclohexyl-1')-4-(1"-bromo)cyclohexyl carbonyl benzene.

(2-c) Synthesis of MPL-953

First, 20 parts of 1-(trans-4'-propylcyclohexyl-1')-4-(1"-bromo)cyclohexyl carbonyl benzene obtained in (2-b) is dissolved in 30 parts of toluene. Separately, 100 parts of methanol containing 2.8 parts of sodium methylate is heated to a boiling state. After the above-mentioned toluene solution is dropped to the boiling methanol, the resultant mixture is stirred at a boiling point of toluene for 2 hours. Next, the reaction mixture is put into 300 parts of iced water, and 100 parts of toluene is added and extracted. After washing with water 3 times, the toluene is concentrated. To the concentrate, 5 parts of concentrated hydrochloric acid and 80 parts of water are added and stirred at a boiling point of water for 2 hours. Next, 100 parts of toluene is added and extracted. After washing with water, the toluene solution is treated by silica gel column chromatography, and the target MPL-953 is taken out. Then, purified MPL-953 is obtained by recrystallization from the toluene (melting point: 87° C.; NI point: 95.5° C.).

SYNTHESIS EXAMPLE 3

Synthesis of Photoinitiator MPL-960 Having a Structure Represented by Formula (IX)

(3-a) Synthesis of 4,4'-bis(trans-1"-(trans-1"-pentylcyclohexyl-4")cyclohexyl-4")benzyl First, 253 parts of carbon disulfide, 31.2 parts of trans-4-(trans-4-pentylcyclohexyl)cyclohexyl benzene (produced by Kanto Kagaku Kabushiki Kaisha), and 20 parts of anhydrous aluminum chloride are mixed together. While cooling the mixture with iced water, 6.35 parts of oxalyl dichloride is dropped to the mixture at 5° C. or less over about 30 minutes. After the resultant mixture is stirred at 5° C. or less for 2 hours and then at 15° C. to 20° C. for another 5 hours, the reaction mixture is put into 300 parts of iced water and decomposed. Then, the carbon disulfide layer is separated and washed with water 3 times. Then, carbon disulfide is distilled off. Thus, crude 4,4'-bis(trans-1"-(trans-1"-pentylcyclohexyl-4")cyclohexyl-4")benzyl is obtained. Thereafter, purified 4,4'-bis(trans-1"-(trans-1"-pentylcyclohexyl-4")cyclohexyl-4")benzyl is obtained by recrystallization from the cyclohexane.

(3-b) Synthesis of MPL-960

First, 4.6 parts of 4,4'-bis(trans-1"-(trans-1"-pentylcyclohexyl-4")cyclohexyl-4")benzyl obtained in (3-a), 50 parts of toluene, 1 part of N,N'-dimethylpropylene urea, and 2.2 parts of dimethyl sulfate are mixed together. Then, 1.9 parts of sodium methylate is added to the mixture at 15° C. to 25° C. over 1 hour. After the resultant mixture is stirred at the same temperature for another 1.5 hours, 20 parts of water is added and stirred for 1 hour. Next, the toluene layer is separated and washed with water, and the toluene solution is treated by silica gel column chromatography, thereby taking out the target MPL-960. Thereafter, purified MPL-960 is obtained by recrystallization from the cyclohexane (melting point: 115° C.; NI point: 270° C.).

SYNTHESIS EXAMPLE 4

Synthesis of Photoinitiator MPL-961 Having a Structure Represented by Formula (X)

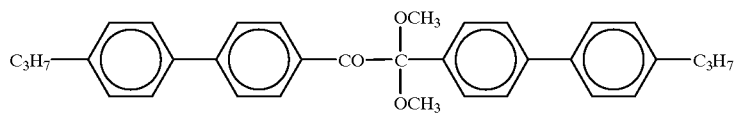

formula (X)

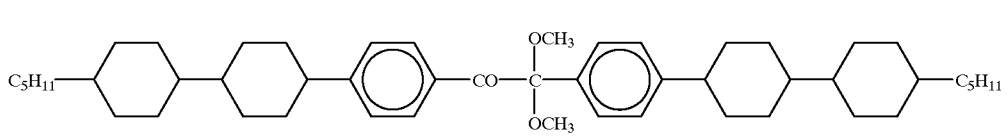

formula (IX)

(4-a) Synthesis of 4,4'-bis(4"-propylphenyl-1")benzyl

First, 253 parts of carbon disulfide, 19.6 parts of 4-propylbiphenyl (produced by Kanto Kagaku Kabushiki Kaisha), and 20 parts of anhydrous aluminum chloride are mixed together. While cooling the mixture with iced water, 6.35 parts of oxalyl dichloride is dropped to the mixture at 5° C. or less over about 30 minutes. After the resultant mixture is stirred at 5° C. or less for 2 hours and then at 15° C. to 20° C. for another 3 hours, the reaction mixture is put into 300 parts of iced water and decomposed. Then, the carbon disulfide layer is separated and washed with water 3 times. Then, carbon disulfide is distilled off. Thus, crude 4,4'-bis(4"-propylphenyl-1")benzyl is obtained. Thereafter, purified 4,4'-bis(4"-propylphenyl-1")benzyl is obtained by recrystallization from the cyclohexane.

(4-b) Synthesis of MPL-961

First, 4.5 parts of 4,4'-bis(4"-propylphenyl-1")benzyl obtained in (4-a), 50 parts of toluene, 1 part of N,N'-dimethylpropylene urea, and 2.2 parts of dimethyl sulfate are mixed together. Then, 1.9 parts of sodium methylate is added to the mixture at 15° C. to 25° C. over 1 hour. After the resultant mixture is stirred at the same temperature for another 1.5 hours, 20 parts of water is added and stirred for 1 hour. Next, the toluene layer is separated and the toluene solution is treated by silica gel column chromatography, thereby taking out the target MPL-961. Thereafter, purified MPL-961 is obtained by recrystallization from the cyclohexane (melting point: 160° C.).

SYNTHESIS EXAMPLE 5

Synthesis of Photoinitiator MPL-962 Having a Structure Represented by Formula (XI)

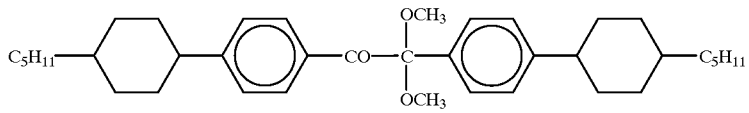

formula (XI)

(5-a) Synthesis of 4,4'-bis(trans-4"-pentylcyclohexyl-1") benzyl

First, 253 parts of carbon disulfide, 23.0 parts of trans-1-pentyl-4-phenylcyclohexane, and 20 parts of anhydrous aluminum chloride are mixed together. While cooling the mixture with iced water, 6.35 parts of oxalyl dichloride is dropped to the mixture at 5° C. or less over about 30 minutes. After the resultant mixture is stirred at 5° C. or less for 2 hours and then at 15° C. to 20° C. for another 3 hours, the reaction mixture is put into 300 parts of iced water and decomposed. Then, the carbon disulfide layer is separated and washed with water 3 times. Then, carbon disulfide is distilled off. Thus, crude 4,4'-bis(trans-4"-pentylcyclohexyl-1")benzyl is obtained. Thereafter, purified 4,4'-bis(trans-4"-pentylcyclohexyl-1")benzyl is obtained by recrystallization from the cyclohexane.

(5-b) Synthesis of MPL-962

First, 4.6 parts of 4,4'-bis(trans-4"-pentylcyclohexyl-1") benzyl, 50 parts of toluene, 1 part of N,N'-dimethylpropylene urea, and 2.2 parts of dimethyl sulfate are mixed together. Then, 1.9 parts of sodium methylate is added to the mixture at 15° C. to 25° C. over 1 hour. After the resultant mixture is stirred at the same temperature for another 1.5 hours, 20 parts of water is added and stirred for 1 hour. Next, the toluene layer is separated and washed with water, and the toluene solution is treated by silica gel column chromatography, thereby taking out the target MPL-962. Thereafter, purified MPL-962 is obtained by recrystallization from the cyclohexane (melting point: 101° C.; NI point: 108° C.).

SYNTHESIS EXAMPLE 6

Synthesis of Photoinitiator MPL-959 Having a Structure Represented by Formula (XII)

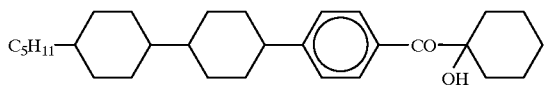

formula (XII)

(6-a) Synthesis of 1-(trans-4-(trans-4-pentylcyclohexyl) cyclohexyl)-4-cyclohexyl carbonyl benzene First, 127 parts of carbon disulfide, 15.4 parts of trans-4-(trans-4-pentylcyclohexyl)cyclohexyl benzene (produced by Kanto Kagaku Kabushiki Kaisha), and 8.4 parts of anhydrous aluminum chloride are mixed together. While cooling the mixture with iced water, 8.1 parts of cyclohexane carbonyl chloride is dropped to the mixture at 5° C. or less. After the resultant mixture is stirred at 5° C. or less for 2 hours and then at 15° C. to 20° C. for another 2 hours, the reaction mixture is put into 100 parts of iced water and decomposed. Then, the carbon disulfide layer is separated and washed with water 3 times. Then, carbon disulfide is distilled off. Thus, crude 1-(trans-4-(trans-4-pentylcyclohexyl)cyclohexyl)-4-cyclohexyl carbonyl benzene is obtained.

(6-b) Synthesis of 1-(trans-4-(trans-4-pentylcyclohexyl) cyclohexyl)-4-(1"-bromo)cyclohexyl carbonyl benzene First, 6.8 parts of 1-(trans-4-(trans-4-pentylcyclohexyl) cyclohexyl)-4-cyclohexyl carbonyl benzene obtained in (6-a) is dissolved in 50 parts of carbon tetrachloride. While cooling the mixture with iced water, 2.6 parts of bromine is dropped to the mixture at 5° C. or less. After the resultant mixture is stirred at 15° C. to 20° C. for 2 hours and hydrogen bromide is removed by aeration, carbon tetrachloride is removed by distillation, thereby obtaining 8.1 parts of 1-(trans-4-(trans-4-pentylcyclohexyl)cyclohexyl)-4-(1"-bromo) cyclohexyl carbonyl benzene.

(6-c) Synthesis of MPL-959

First, 8.1 parts of 1-(trans-4-(trans-4-pentylcyclohexyl) cyclohexyl)-4-(1"-bromo)cyclohexyl carbonyl benzene obtained in (6-b) is dissolved in 10 parts of toluene. Separately, 13 parts of methanol containing 0.9 parts of sodium methylate is heated to a boiling state. After the above-mentioned toluene solution is dropped to the boiling methanol, the resultant mixture is stirred at a boiling point of toluene for 2 hours. Next, the reaction mixture is put into 300 parts of iced water, and 50 parts of toluene is added and extracted. After washing with water 3 times, the toluene is concentrated. To the concentrate, 3 parts of concentrated hydrochloric acid and 50 parts of water are added and stirred at a boiling point of water for 2 hours. Next, 100 parts of toluene is added and extracted. After washing with water, the toluene solution is treated by silica gel column chromatography, and the target MPL-959 is taken out. Then, purified MPL-959 is obtained by recrystallization from the toluene (melting point: 170° C.; NI point: 176° C.).

SYNTHESIS EXAMPLE 7

Synthesis of Photoinitiator MPL-950 Having a Structure Represented by Formula (XIII)

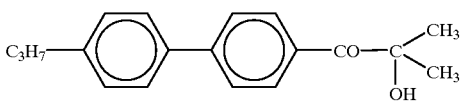

formula (XIII)

(7-a) Synthesis of 4-propyl-4'-isopropyl carbonyl biphenyl

First, 126 parts of carbon disulfide, 9.8 parts of 4-propylbiphehyl (produced by Kanto Kagaku Kabushiki Kaisha), and 8.4 parts of anhydrous aluminum chloride are mixed together. While cooling the mixture with iced water, 5.9 parts of isobutyryl chloride is dropped to the mixture at 5° C. or less over about 30 minutes. After the resultant mixture is stirred at 5° C. or less for 2 hours and then at 15° C. to 20° C. for another 2 hours, the reaction mixture is put into 150 parts of iced water and decomposed. Then, the carbon disulfide layer is separated and washed with water 3 times. Then, carbon disulfide is distilled off. Thereafter, the residue is distilled under reduced pressure to obtain a fraction at 190° C. to 195° C./4 mmHg.

(7-b) Synthesis of 4-propyl-4'-(2"-bromoisopropyl) carbonyl biphenyl

First, 13.1 parts of 4-propyl-4'-isopropyl carbonyl biphenyl obtained in (7-a) is dissolved in 60 parts of carbon tetrachloride. While cooling the mixture with iced water, 7.9 parts of bromine is dropped to the mixture at 5° C. or less. After the resultant mixture is stirred at 5° C. for 3 hours and hydrogen bromide is removed by aeration, carbon tetrachloride is removed by distillation, thereby obtaining 4-propyl-4'-(2"-bromoisopropyl) carbonyl biphenyl.

(7-c) Synthesis of MPL-950

First, 17.1 parts of 4-propyl-4'-(2"-bromoisopropyl) carbonyl biphenyl obtained in (7-b) is dissolved in 25 parts of toluene and 100 parts of methanol. After the solution is heated to a boiling point of toluene and 50 parts of a 10% aqueous solution of sodium hydroxide is dropped, the resultant mixture is further stirred at 65° C. to 70° C. for another 8 hours. Next, 100 parts of water and 50 parts of toluene are added, and the toluene layer is separated. After washing with water 3 times, the toluene is concentrated by distillation, thereby obtaining crude MPL-950. Then, purified MPL-950 is obtained by recrystallization from the hexane (melting point: 98.5° C.).

SYNTHESIS EXAMPLE 8

Synthesis of Photoinitiator MPL-956 Having a Structure Represented by Formula (XIV)

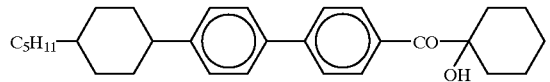

formula (XIV)

(8-a) Synthesis of 1-(trans-4-pentylcyclohexyl)-4-cyclohexyl carbonyl biphenyl

First, 127 parts of carbon disulfide, 15.3 parts of 4-(trans-4-pentylcyclohexyl)biphenyl (produced by Kanto Kagaku Kabushiki Kaisha), and 8.4 parts of anhydrous aluminum chloride are mixed together. While cooling the mixture with iced water, 8.1 parts of cyclohexane carbonyl chloride is dropped to the mixture at 5° C. or less. After the resultant mixture is stirred at 5° C. or less for 2 hours and then at 15° C. to 20° C. for another 2 hours, the reaction mixture is put into 100 parts of iced water and decomposed. Then, the carbon disulfide layer is separated and washed with water 3 times. Then, carbon disulfide is distilled off. Thus, crude 1-(trans-4-pentylcyclohexyl)-4-cyclohexyl carbonyl biphenyl is obtained.

(8-b) Synthesis of 1-(trans-4-pentylcyclohexyl)-4-(1"-bromo)cyclohexyl carbonyl biphenyl First, 6.8 parts of 1-(trans-4-pentylcyclohexyl)-4-cyclohexyl carbonyl biphenyl obtained in (8-a) is dissolved in 50 parts of carbon tetrachloride. While cooling the mixture with iced water, 2.6 parts of bromine is dropped to the mixture at 5° C. or less. After the resultant mixture is stirred at 15° C. to 20° C. for 2 hours and hydrogen bromide is removed by aeration, carbon tetrachloride is removed by distillation, thereby obtaining 8.1 parts of 1-(trans-4-pentylcyclohexyl)-4-(1"-bromo) cyclohexyl carbonyl biphenyl.

(8-c) Synthesis of MPL-956

First, 8.1 parts of 1-(trans-4-pentylcyclohexyl)- 4-(1"-bromo)cyclohexyl carbonyl biphenyl obtained in (8-b) is dissolved in 10 parts of toluene. Separately, 13 parts of methanol containing 0.9 parts of sodium methylate is heated to a boiling state. After the above-mentioned toluene solution is dropped to the boiling methanol, the resultant mixture is stirred at a boiling point of toluene for 2 hours. Next, the reaction mixture is put into 300 parts of iced water, and 50 parts of toluene is added and extracted. After washing with water 3 times, the toluene is concentrated. To the concentrate, 3 parts of concentrated hydrochloric acid and 50 parts of water are added and stirred at a boiling point of water for 2 hours. Next, 100 parts of toluene is added and extracted. After washing with water, the toluene solution is treated by silica gel column chromatography, and the target MPL-956 is taken out. Then, purified MPL-956 is obtained by recrystallization from the toluene (melting point: 144 to 146° C.).

In accordance with the above-described synthesis examples 1 through 8, exemplary photoinitiators shown in Table 1 can be synthesized.

TABLE 1

| $C_nH_{2n+1}$ | A | B | Benzene ring | p | q | X | Y | Z |
|---|---|---|---|---|---|---|---|---|
| $C_7H_{15}$ | ⬡ | — | ⬢ | 1 | 0 | $C_2H_5$ | $OC_2H_5$ | $C_7H_{15}$—⬡—H—⬢— |
| $C_7H_{15}$ | ⬡ | ⬡ | ⬢ | 1 | 1 | $C_3H_7$ | $OC_3H_7$ | $C_7H_{15}$—⬡—H—⬡—H—⬢— |
| $C_3H_7$ | ⬡ | — | ⬢-F | 1 | 0 | $CH_3$ | $OCH_3$ | $C_3H_7$—⬡—H—⬢-F |

TABLE 1-continued

| $C_nH_{2n+1}$ A | B | Benzene ring | p | q | X | Y | Z |
|---|---|---|---|---|---|---|---|
| $C_7H_{15}$  |  | 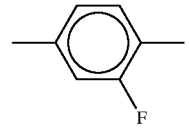 | 1 | 1 | $CH_3$ | $OCH_3$ | 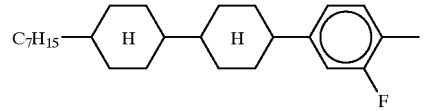 |
| $C_3H_7$  | — | 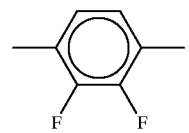 | 1 | 0 | $CH_3$ | $OCH_3$ | 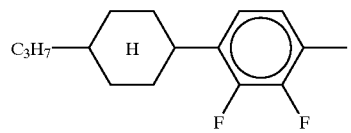 |
| $C_3H_7$  | — | 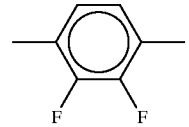 | 1 | 0 | H | |  (Y and Z are bonded together to form a ring.) |
| $C_3H_7$  |  | 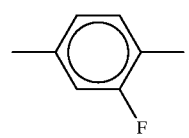 | 1 | 1 | H | |  (Y and Z are bonded together to form a ring.) |

In Table 1, A, B, p, q, X, Y and Z each refer to A, B, p, q, X, Y and Z in general formula (I). The "benzene ring" in Table 1 refers to the benzene ring bonded to B adjacent to the carbonyl ring in general formula (I), or when B is not existent, the benzene ring bonded to A adjacent to the carbonyl ring in general formula (I).

EXAMPLE 1, COMPARATIVE EXAMPLE 1

As shown in FIG. 1A, the LCD device 10 in Example 1 according to the present invention includes a pair of plates 1 and 2 and a liquid crystal layer interposed between the plates 1 and 2. The liquid crystal layer contains a plurality of liquid crystal domains 8 each substantially surrounded by a polymer wall 7. In this example, the liquid crystal domains 8 are substantially surrounded by the plates 1 and 2 and the polymer wall 7. The plates 1 and 2 each has a transparent electrode (not shown) in a desired pattern on a surface thereof in the vicinity of the liquid crystal layer. Liquid crystal molecules 9 in the liquid crystal domain 8 are twisted in an axially symmetrical state. In this example, the twist angle is set to be 90 degrees.

In this example, the LCD device 10 is of transmission-type. In the case of a reflection-type LCD device, one of the plates can be formed of an opaque plate such as a semiconductor plate.

In this example, one liquid crystal domain is formed for each of a plurality of pixel areas. In the case where the pixels have different pitches in perpendicular directions to each other, a plurality of liquid crystal domains can be formed for each pixel area. In such a case also, the liquid crystal domains are allowed to be arranged spatially regularly.

A method for producing the LCD device 10 will be described.

Two glass plates 1 and 2 each having a thickness of about 1.1 mm and having thereon a transparent electrode having a thickness of 50 nm and formed of ITO (mixture of indium oxide and tin oxide) were provided. The glass plates 1 and 2 were combined together while a gap therebetween was maintained as a cell thickness by spacers (not shown) having a diameter of about 5 μm. In this example, an active matrix liquid crystal cell was produced by a known method.

A precursor mixture was injected into the resultant cell by vacuum injection. The precursor mixture was obtained by uniformly mixing a photopolymerizable resin, a liquid crystal material, and the photoinitiator MPL-953 obtained in synthesis example 2. Used as the photopolymerizable resin was a mixture of 0.225 g of a monofunctional acrylate MPL-209S (produced by Nippon Kayaku Co., Ltd.), 0.15 g of lauryl acrylate, 0.225 g of a bifunctional resin R-684 (produced by Nippon Kayaku Co., Ltd.), and 0.15 g of a photopolymerization retarding resin t-butoxystyrene. Used as the liquid crystal material was 4.3 g of ZLI-4792 (produced by Merck & Co. Inc.; Δn=0.094; adjusted to have a chiral pitch of 90 degrees between the two plates with chiral agent S-811). The photoinitiator MPL-953 was used in an amount of 0.03 g.

A photomask 20 shown in FIG. 2 having light-blocking areas 20a and light-transmissive areas 20b was put on the liquid crystal cell, and the cell was irradiated with ultraviolet rays from a high-pressure mercury lamp through the photomask 20 at 100° C. for 8 minutes while applying a voltage having a frequency of 60 Hz and an amplitude of ±3 V between the transparent electrodes. The cell was put below the mercury lamp at 10 mW/cm$^2$, so that collimated light rays were obtained. Thus, the precursor mixture in the cell was irradiated by the ultraviolet rays spatially having an intensity distribution of a regular pattern. The temperature of the light irradiation is preferable higher than the phase melting temperature and also equal to or lower than the $T_{N-I}$ point of the liquid crystal phase after phase separation. The orientation of the liquid crystal molecules is stabilized by applying a voltage to the liquid crystal phase while the liquid crystal phase is formed by photopolymerization-induced phase separation.

While the voltage was applied, the cell was gradually cooled (10° C./hour) to 25° C. (the liquid crystal material was in a nematic state), and the entire surface of the cell was irradiated with ultraviolet rays for 3 minutes continuously without a photomask, thereby further curing the resin in the cell.

Figure 3:
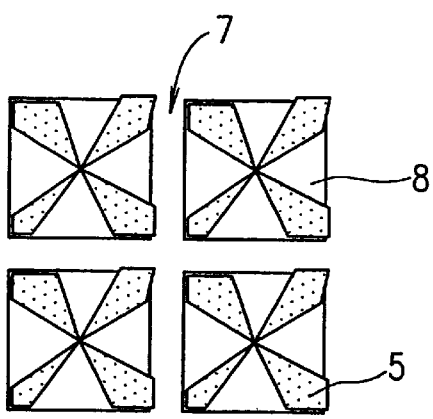
FIG. 3 schematically shows a liquid crystal layer of an LCD device according to the present invention observed by a polarization microscope.

The resultant liquid crystal panel was observed and confirmed to have the polymer wall 7 and the liquid crystal domains 8 as shown in FIG. 3, substantially reflecting the pattern of the photomask 20 (FIG. 2). Based on a radial light extinction pattern 5 observed in the liquid crystal domains 8, it was confirmed that the liquid crystal molecules were oriented in an axially symmetric state with respect to an axis in the vicinity of the center of the liquid crystal domains 8. At such an axially symmetric orientation, liquid crystal molecules having a molecule axis parallel to the polarizing axis of the polarizer and liquid crystal molecules having a molecule axis tilting with respect to the polarizing axis of the polarizer are continuously existent. As a result, a radial light extinction pattern as shown in FIG. 3 is observed.

Next, polarizers were put on two outer surfaces of the liquid crystal panel so that the polarizing axes of the polarizers were perpendicular to each other. The characteristics of the LCD device 10 in Example 1 are shown in Table 2. Table 2 also shows the characteristics of an LCD device produced as comparative example 1. Comparative example 1 was different from Example 1 only in that Irgacure184 (produced by Ciba-Geigy Corporation) was used as the photoinitiator.

The evaluation criteria of the LCD devices were as follows.

Response time (response speed): The time period required for the relative transmittance to change by 90% was measured while changing the applied voltage between 0 V to 5 V. The evaluation was conducted by the sum of $\tau_r + \tau_d$ (ms), where $\tau_r$ is the time period required for the transmittance to rise (ms) and $\tau_d$ is the time period required for the transmittance to fall (ms).

$T_{N-I}$ point in the liquid crystal domain: The temperature at which an isotropic liquid crystal phase appears in the nematic phase was observed by a polarization microscope at the measurement point at the center of the panel while increasing the temperature of the panel at the rate of 0.1° C./min. The $T_{N-I}$ distribution in the liquid crystal domain is represented by an absolute value of the difference between the $T_{N-I}$ temperatures at an injection opening and a fixed point opposed to the injection opening.

Voltage retaining ratio: After a pulse voltage having a selective pulse width of 10 $\mu$sec. and an amplitude of 5 V was applied, the ratio of the voltage retained during 16.7 msec. was measured.

TABLE 2

|  | Example 1 | Comparative example 1 |
| --- | --- | --- |
| Response speed (msec.) | 59 | 69 |
| $T_{N-1}$ temperature in LC domain (° C.) (panel center) | 75 | 70 |
| $T_{N-1}$ temperature distribution in LC domain (° C.) | <0.4 | 0.9 |
| Voltage retaining ratio (%) at 30° C. | 95 | 92 |

As can be understood from Table 2, the LCD device 10 in Example 1 using the photoinitiator MPL-953 is superior to the LCD device as comparative example 1 using a conventional photoinitiator in terms of display characteristics of the liquid crystal panel including the display uniformity.

EXAMPLE 2, COMPARATIVE EXAMPLE 2

In Example 2, an LCD device was produced in a similar manner as in Example 1 except that a patterning wall was provided in an area of the liquid crystal layer in which the polymer wall was to be formed, and the liquid crystal cell was irradiated with ultraviolet rays without using a photomask. A different type of precursor from that of Example 1 was used.

Figure 4:
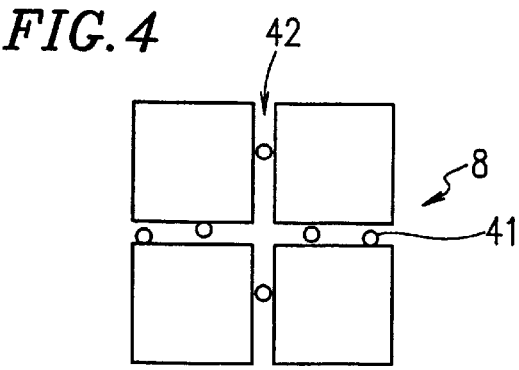
FIG. 4 is schematic plan view of a plate of an LCD device in one example according to the present invention, illustrating a patterning wall.

Two glass plates each having a thickness of about 1.1 mm and having thereon a transparent electrode formed of ITO were provided. As shown in FIG. 4, a patterning wall 42 containing spacers 41 having a diameter of about 5 $\mu$m was formed on one of the plates to a height of about 2.7 $\mu$m. In this example, the patterning wall 42 was formed of a negative photoresist OMR83 (produced by Tokyo Ohka Kabushiki Kaisha). The two glass plates were combined together by a seal resin. Thus, a liquid crystal cell was produced.

A precursor mixture was injected into the cell by vacuum injection. The precursor mixture was obtained by uniformly mixing a photopolymerizable resin, a liquid crystal material, and the photoinitiator MPL-960 obtained in synthesis example 3. Used as the photopolymerizable resin was a mixture of 0.04 g of isobornyl acrylate, 0.02 g of R-684 (produced by Nippon Kayaku Co., Ltd.), and 0.02 g of p-phenylstyrene. Used as the liquid crystal material was 0.92 g of ZLI-4792 (produced by Merck & Co. Inc.; $\Delta n=0.094$; adjusted to have a chiral pitch of 90 degrees between the two plates with chiral agent S-811). The photoinitiator MPL-960 was used in an amount of 0.005 g.

After the orientation of the liquid crystal molecules was controlled by phase separation, the liquid crystal molecules are oriented in an axially symmetrical state in liquid crystal domains each surrounded by the patterning wall 42. The precursor mixture in the cell was irradiated by ultraviolet rays at room temperature for 15 minutes below a high-pressure mercury lamp at 6 mW/cm². In order to completely cure the resin, irradiation with ultraviolet rays was performed for another 10 minutes continuously using the same lamp as a light source.

The resultant liquid crystal panel was observed to confirm that the liquid crystal molecules were oriented in an axial symmetrical state as in Example 1.

Next, polarizers were put on two outer surfaces of the liquid crystal panel so that the polarizing axes of the polarizers were perpendicular to each other. The characteristics of the resultant LCD device in Example 2 are shown in Table 3. Table 3 also shows the characteristics of an LCD device produced as comparative example 2. Comparative example 2 was different from Example 2 only in that Irgacure651 (produced by Ciba-Geigy Corporation) was used as the photoinitiator.

The evaluation criteria of the LCD devices were the same as those in Example 1.

TABLE 3

|  | Example 2 | Comparative example 2 |
| --- | --- | --- |
| Response speed (msec.) | 43 | 63 |
| $T_{N-1}$ temperature in LC domain (° C.) (panel center) | 80 | 76 |
| $T_{N-1}$ temperature distribution in LC domain (° C.) | <0.2 | 0.9 |
| Voltage retaining ratio (%) at 30° C. | 96 | 94 |

As can be understood from Table 3, the LCD device in Example 2 using the photoinitiator MPL-960 is superior to the LCD device as comparative example 2 using a conventional photoinitiator in terms of display characteristics of the liquid crystal panel including the display uniformity.

EXAMPLE 3, COMPARATIVE EXAMPLE 3

In Example 3, an LCD device was produced in the following manner.

Figure 5A:
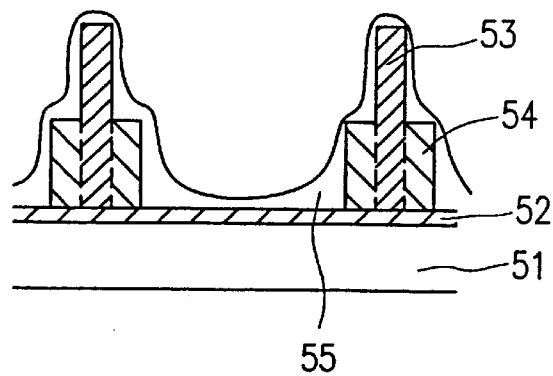
FIG. 5A is a schematic cross-sectional view of a liquid crystal layer of an LCD device in one example according to the present invention.
Figure 5B:
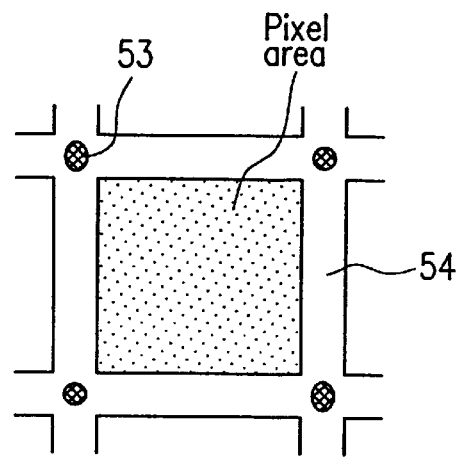
FIG. 5B is a schematic plan view of the liquid crystal layer shown in FIG. 5A.

As shown in FIG. 5A, a transparent electrode 52 formed of ITO was formed on a glass plate 51. Column-like spacers 53 having a thickness of about 5.3 μm were formed on the glass plate 51 by photolithography using photosensitive polyimide. The spacers 53 were formed in areas corresponding to areas excluded from the pixel areas as shown in FIG. 5B. Next, a patterning wall 54 having a thickness of about 3 μm was formed so as to surround the pixel areas. The patterning wall 54 was formed of a negative photoresist OMR83 (produced by Tokyo Ohka Kabushiki Kaisha). Then, a liquid crystal alignment layer 55 was formed of JALS-204 (produced by JSR Corporation) so as to cover the spacers 53 and the patterning wall 54. Although not shown, the same type of liquid crystal alignment layer was formed on a transparent electrode of the other glass plate. The two glass substrates were combined together to produce a liquid crystal cell.

A precursor mixture of a photopolymerizable resin, a liquid crystal material, and a photoinitiator MPL-957 obtained in synthesis example 1 was injected into the cell by vacuum injection. Used as the liquid crystal material was an Nn liquid crystal material (Δε: −4.0; Δn: 0.08; $T_{N-1}$: 90° C.; cell gap: 5.4 μm; set to have a twist angle of 90 degrees using a chiral agent. The twist angle is inherent to liquid crystal materials. Used as the photopolymerizable resin was 0.8 wt. % of lauryl acrylate. The photoinitiator MPL-957 was used in an amount of 0.15 wt. %.

After the injection, the liquid crystal molecules were oriented in an axially symmetrical state by applying a voltage of 5 V. The domains in which the liquid crystal molecules were oriented in an axially symmetrical state had a central axis at the center of the pixel area and formed within the patterning wall 54. Then, irradiation with ultraviolet rays of 365 nm was performed at room temperature for 10 minutes at 6 mW/cm² while applying a voltage which is 0.5 V higher than the threshold voltage, thereby curing the photopolymerizable resin in the mixture. Thus, the axial symmetric orientation in the liquid crystal domains was stabilized.

Next, polarizers were put on two outer surfaces of the liquid crystal panel so that the polarizing axes of the polarizers were perpendicular to each other. The characteristics of the resultant LCD device in Example 3 are shown in Table 4. Table 4 also shows the characteristics of an LCD device produced as comparative example 3. Comparative example 3 was different from Example 3 only in that Irgacure651 (produced by Ciba-Geigy Corporation) was used as the photoinitiator.

The evaluation criteria of the LCD devices were as follows.

Electrooptical characteristics: The voltage vs. transmittance characteristic was measured by a liquid crystal characteristic evaluation system LCD-5000 (produced by Otsuka Electronics Co., Ltd.). As a reference, a cell having polarizers on two outer surfaces of the above-described glass plates in a parallel-Nicols arrangement was used.

Residual DC voltage: A voltage of DC 10 V was applied for 1 hour and shortcircuiting occurred for 1 second by a capacitor dielectric absorption method. Ten minutes later, the voltage was measured. The measurement temperature was 60° C.

TABLE 4

|  | Example 3 | Comparative example 3 |
|---|---|---|
| Response speed (msec.) | 46 | 69 |
| Voltage retaining ratio (%) at 30° C. | 96 | 94 |
| Light transmittance when no voltage is applied (%) | 0.04 | 0.06 |
| Light transmittance when a saturated voltage is applied (%) | 73 | 63 |
| Residual DC voltage at 60° C. (mV) | 85 | 158 |

As can be understood from Table 4, the LCD device in Example 3 using the photoinitiator MPL-957 is superior to the LCD device as comparative example 3 using a conventional photoinitiator in terms of the display characteristics such as the contrast of the panel and the response speed and also the residual DC voltage, which is a cause of remaining images.

EXAMPLE 4, COMPARATIVE EXAMPLE 4: TN MODE

Figure 6:
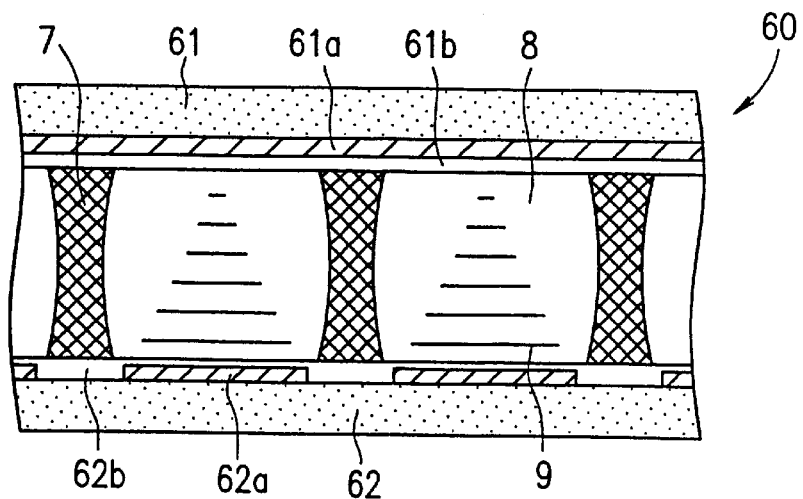
FIG. 6 is a schematic cross-sectional view of an LCD device in one example according to the present invention.

FIG. 6 is a cross-sectional view of an LCD device 60 in Example 4 according to the present invention. The LCD device 60 in Example 4 has substantially the same structure as the LCD device 10 in Example 1 except that the liquid crystal molecules 9 in the liquid crystal domains are oriented in a twisted nematic (TN) state. In order to obtain the TN orientation, alignment layers 61b and 62b are provided respectively on glass plates 61 and 62 in the vicinity of a liquid crystal layer interposed between the plates 61 and 62. The alignment layers 61b and 62b are treated by rubbing in a prescribed direction.

The LCD device 60 was produced in the following manner.

The glass plates 61 and 62 respectively having thereon transparent electrodes 61a and 62a formed of ITO were provided. On each of the glass plates 61 and 62, a liquid crystal alignment layer AL4552 (produced by JSR Corporation) was applied and treated by rubbing with a nylon cloth. The two glass plates 61 and 62 with the alignment layers were combined so that the rubbing directions were perpendicular to each other, thereby producing a liquid crystal cell.

A precursor mixture of a photopolymerizable resin, a liquid crystal material, and a photoinitiator MPL-956 obtained in synthetic example 8 was injected into the cell by vacuum injection. Used as the photopolymerizable resin was a mixture of 0.04 g of a monofunctional acrylate MPL-209S and 0.02 g of lauryl acrylate. Used as the liquid crystal material was 0.92 g of ZLI-4792 (produced by Merck & Co., Inc.). The photoinitiator MPL-956 was used in an amount of 0.005 g. In this example, the ZLI-4792 was adjusted to have a chiral pitch of 80 μm.

A photomask 20 (FIG. 2) having light-blocking areas 20a and light-transmissive areas 20b was put on the liquid crystal cell, and a TN mode liquid crystal panel including liquid crystal domains 8 each surrounded by the polymer wall 7 was produced in the same manner as in Example 1.

Next, polarizers were put on two outer surfaces of the liquid crystal panel so that the polarizing axes of the polarizers were parallel to the rubbing direction of the corresponding alignment layer and perpendicular to each other. Thus, the LCD device 60 was obtained.

In LCD device 60, the liquid crystal molecules 9 in each liquid crystal domain 8 were oriented in a TN state and uniformly. The display characteristics did not change when the display surface was pushed by a pen.

The response speed of the LCD device 60 in Example 4 is shown in Table 5. Table 5 also shows the response speed of an LCD device produced as comparative example 4. Comparative example 4 was different from Example 4 only in that Irgacure651 (produced by Ciba-Geigy Corporation) was used as the photoinitiator.

TABLE 5

|  | Example 4 | Comparative example 4 |
|---|---|---|
| Response speed (msec.) | 41 | 88 |

As can be understood from Table 5, the photoinitiator MPL-956 improves the orientation stability of the liquid crystal molecules and also improves the uniformity of injection of the precursor mixture (i.e., the composition of the precursor mixture is not changed). As a result, the display characteristics of the LCD device are enhanced.

EXAMPLE 5, COMPARATIVE EXAMPLE 5: STN MODE)

An LCD device in Example 5 according to the present invention has substantially the same structure as the LCD device 10 in Example 1 except that the liquid crystal molecules in the liquid crystal domains are oriented in a super twisted nematic (STN) state. In this example, a simple matrix LCD device will be described.

The LCD device in Example 5 was produced in the following manner.

On each of two glass plate having thereon a striped transparent electrode formed of ITO, a polyimide layer (Sun Ever; produced by Nissan Chemical Industries, Ltd.) was formed as an alignment layer and treated by rubbing with a nylon cloth. The resultant glass plates with polyimide layers were combined so that the rubbing directions were 240 degrees with respect to each other.

A precursor mixture of a photopolymerizable resin, a liquid crystal material, and a photoinitiator MPL-957 used in Example 3 was injected into the cell by vacuum injection. Used as the photopolymerizable resin was a mixture of 0.04 g of a monofunctional acrylate MPL-209S and 0.02 g of R-684. Used as the liquid crystal material was 0.92 g of ZLI-4792 (produced by Merck & Co., Inc.). The photoinitiator MPL-957 was used in an amount of 0.005 g. In this example, the ZLI-4792 was adjusted to have a chiral pitch of 240 degrees between the two plates.

A photomask 20 (FIG. 2) having light-blocking areas 20a and light-transmissive areas 20b was put on the liquid crystal cell, and an STN mode liquid crystal panel including liquid crystal domains 8 each surrounded by the polymer wall 7 was produced in the same manner as in Example 1.

Next, polarizers were put on two outer surfaces of the liquid crystal panel so that the polarizing axes of the polarizers were 45 degrees with respect to the rubbing direction of the corresponding alignment layer and 105 degrees with respect to each other. Thus, the LCD device in this example was obtained.

In LCD device in this example, the liquid crystal molecules in each liquid crystal domain were oriented in an STN state and uniformly. The display characteristics did not change when the display surface was pushed by a pen.

The response speed of the LCD device in Example 5 is shown in Table 6. Table 6 also shows the response speed of an LCD device produced as comparative example 5. Comparative example 5 was different from Example 5 only in that Irgacure651 (produced by Ciba-Geigy Corporation) was used as the photoinitiator.

TABLE 6

|  | Example 5 | Comparative example 5 |
|---|---|---|
| Response speed (msec.) | 170 | 320 |

As can be understood from Table 6, the photoinitiator MPL-957 improves the orientation stability of the liquid crystal molecules and also improves the uniformity of injection of the precursor mixture (i.e., the composition of the precursor mixture is not changed). As a result, the display characteristics of the LCD device are enhanced.

The liquid crystal molecules in the liquid crystal domains can be oriented in a homogenous manner, homeotropic manner, or hybrid manner so as to realize ECB mode display.

EXAMPLE 6, COMPARATIVE EXAMPLE 6: SSFLC MODE

An LCD device in Example 6 according to the present invention has substantially the same structure as the LCD device 10 in Example 1 except that a surface stabilized ferroelectric liquid crystal (SSFLC) material were used for forming the liquid crystal domains. In this example, a simple matrix LCD device will be described.

The LCD device in Example 6 was produced in the following manner.

On each of two glass plates having thereon a striped transparent electrode formed of ITO, a polyimide layer (Sun Ever; produced by Nissan Chemical Industries, Ltd.) was formed as an alignment layer and treated by rubbing with a nylon cloth. The resultant glass plates with polyimide layers were combined so that the striped transparent electrodes were perpendicular to each other and the rubbing directions were perpendicular to each other.

A precursor mixture was injected into the cell by vacuum injection. The precursor mixture was a uniform mixture of a photopolymerizable resin, a liquid crystal material, and a photoinitiator MPL-957 used in Example 3. Used as the photopolymerizable resin was a mixture of 0.03 g of polyethyleneglycol diacrylate (NK ester A-200; produced by Shin-Nakamura Kagaku Kogyo), 0.14 g of lauryl acrylate, and 0.03 g of styrene. Used as the liquid crystal material was 0.82 g of ZLI-4003 (produced by Merck & Co., Inc.). The photoinitiator MPL-957 was used in an amount of 0.005 g.

A photomask 20 (FIG. 2) having light-blocking areas 20a and light-transmissive areas 20b was put on the liquid crystal cell, and an SSFLC mode liquid crystal panel including liquid crystal domains 8 each surrounded by the polymer wall 7 was produced in the same manner as in Example 1.

Next, polarizers were put on two outer surfaces of the liquid crystal panel so that the polarizing axes of the polarizers were perpendicular to each other. Thus, the LCD device in this example was obtained.

In LCD device in this example, the liquid crystal molecules in each liquid crystal domain were oriented uniformly. The display characteristics did not change when the display surface was pushed by a pen. This proves that an orientation disturbance caused by an external force, which is a problem in a conventional FLC mode liquid crystal panel, did not occur.

The response speed of the LCD device in Example 6 is shown in Table 7. Table 7 also shows the response speed of an LCD device produced as comparative example 6. Comparative example 6 was different from Example 6 only in that Irgacure651 (produced by Ciba-Geigy Corporation) was used as the photoinitiator.

TABLE 7

|  | Example 6 | Comparative example 6 |
| --- | --- | --- |
| Response speed ($\mu$sec.) | 200 | 550 |

As can be understood from Table 7, the photoinitiator MPL-957 improves the display characteristics of the LCD device such as the display uniformity and the response speed.

A photoinitiator according to the present invention includes a liquid crystal-like structure introduced into molecules thereof. Such a photoinitiator prevents the orientation of the liquid crystal molecules from being disturbed. Since such a photoinitiator has an increased molecular weight, it is less likely to be vaporized against the pressure reduction conducted while a precursor mixture containing the photoinitiator is injected to a liquid crystal panel. An LCD device containing such a photoinitiator improves the display characteristics such as display uniformity, the response speed and the voltage retaining ratio. The pressure tightness of the liquid crystal panel is also improved.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A photoinitiator represented by general formula (I):

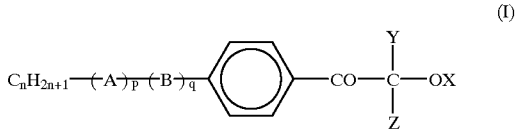

(I)

where n is an integer of 1 or greater and of 9 or less; A and B are each a trans cyclohexane ring or a benzene ring, the benzene ring being allowed to include a fluorine atom or a methyl group as a substituent, the benzene ring adjacent to a carbonyl group being allowed to include a fluorine atom or a methyl group as a substituent; p and q are each 0 or 1, p and q are not simultaneously 0; X is an alkyl group of $C_1$ through $C_3$ or hydrogen atom, Y is a methyl group, ethyl group or alkoxy group of $C_1$ through $C_3$, and Z is a methyl group, ethyl group, alkyl-substituted phenyl group or a group represented by general formula (II), Y and Z being allowed to bonded together to form a ring:

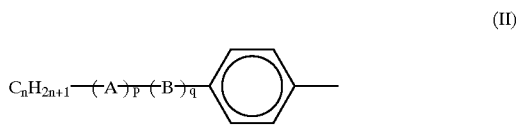

(II)

where A, B, n, p and q are identical with those in general formula (I).

2. A photoinitiator according to claim 1, wherein p is 1 in general formulas (I) and (II).

3. A photoinitiator according to claim 1, wherein p and q are each 1 in general formulas (I) and (II).

4. A photoinitiator according to claim 1, wherein A and B are each a trans cyclohexane in general formulas (I) and (II).

5. A photoinitiator according to claim 1, wherein p is 1, q is 0, and A and B are each a trans cyclohexane in general formulas (I) and (II).

6. A photoinitiator represented by general formula (III):

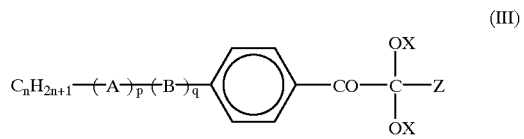

(III)

where n is an integer of 1 or greater and of 9 or less; A and B are each a trans cyclohexane ring or a benzene ring, the benzene ring being allowed to include a fluorine atom or a methyl group as a substituent, the benzene ring adjacent to a carbonyl group being allowed to include a fluorine atom or a methyl group as a substituent; p and q are each 0 or 1, p and q are not simultaneously 0; X is an alkyl group of $C_1$ through $C_3$, and Z is an alkyl-substituted phenyl group or a group represented by general formula (IV):

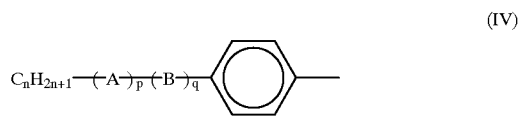

(IV)

where A, B, n, p and q are identical with those in general formula (III).

7. A photoinitiator according to claim 6, wherein p is 1 in general formulas (III) and (IV).

8. A photoinitiator according to claim 6, wherein p and q are each 1 in general formulas (III) and (IV).

9. A photoinitiator according to claim 6, wherein A and B are each a trans cyclohexane in general formulas (III) and (IV).

10. A photoinitiator according to claim 6, wherein p is 1, q is 0, and A and B are each a trans cyclohexane in general formulas (III) and (IV).

11. A photoinitiator according to claim 1, wherein X is a hydrogen atom, and Y and Z are each a methyl group or ethyl group or Y and Z are allowed to be bonded together to form a ring in general formula (I).

12. A photoinitiator according to claim 10, wherein n is an integer of 3 or more and 7 or less and X is a methyl group in general formulas (III) and (IV).

13. A photoinitiator according to claim 10, wherein Z is a group represented by general formula (IV) and X is a methyl group in general formula (III), and n is an integer of 3 or more and 7 or less in general formula (IV).

14. A photoinitiator according to claim 5, wherein n is an integer of 3 or more and 7 or less, X is a hydrogen atom, and Y and Z are bonded together to form a cyclohexane ring in general formula (I).

15. A photoinitiator according to claim 13, wherein n is 3, 5 or 7 in general formulas (III) and (IV).

16. A photoinitiator according to claim 14, wherein n is 3, 5 or 7 in general formula (I).

17. A photopolymerizable resin composition, comprising at least one photoinitiator according to claim 1; and a photopolymerizable resin having a polymerizable functional group.

18. A photopolymerizable resin composition, comprising at least one photoinitiator according to claim 6; and a photopolymerizable resin having a polymerizable functional group.

19. A photopolymerizable resin composition according to claim 17, wherein the photoinitiator is contained in an amount of 0.3 wt. % to 40 wt. % based on a weight of the photopolymerizable resin.

20. A photopolymerizable resin composition according to claim 18, wherein the photoinitiator is contained in an amount of 0.3 wt. % to 40 wt. % based on a weight of the photopolymerizable resin.

21. A polymer produced by photopolymerization of a photopolymerizable resin composition according to claim 17.

22. A polymer produced by photopolymerization of a photopolymerizable resin composition according to claim 18.

23. A liquid crystal display device, comprising a pair of plates; and a polymer wall and liquid crystal domains surrounded by the polymer wall, the polymer wall and the liquid crystal domains being interposed between the pair of plates,
wherein the polymer wall includes a polymer according to claim 21.

24. A liquid crystal display device, comprising a pair of plates; and a polymer wall and liquid crystal domains surrounded by the polymer wall, the polymer wall and the liquid crystal domains being interposed between the pair of plates,
wherein the polymer wall includes a polymer according to claim 22.

25. A liquid crystal display device, comprising a pair of plates; and liquid crystal domains and a wall for surrounding the liquid crystal domains, the liquid crystal domains and the wall being interposed between the pair of plates,
wherein at least an area of the wall in contact with the liquid crystal domains includes a polymer according to claim 21.

26. A liquid crystal display device, comprising a pair of plates; and liquid crystal domains and a wall for surrounding the liquid crystal domains, the liquid crystal domains and the wall being interposed between the pair of plates,
wherein at least an area of the wall in contact with the liquid crystal domains includes a polymer according to claim 22.

27. A liquid crystal display device according to claim 23, wherein liquid crystal molecules in the liquid crystal domains are allowed to be oriented in an axially symmetric state.

28. A liquid crystal display device according to claim 24, wherein liquid crystal molecules in the liquid crystal domains are allowed to be oriented in an axially symmetric state.

29. A liquid crystal display device according to claim 25, wherein liquid crystal molecules in the liquid crystal domains are allowed to be oriented in an axially symmetric state.

30. A liquid crystal display device according to claim 26, wherein liquid crystal molecules in the liquid crystal domains are allowed to be oriented in an axially symmetric state.

31. A liquid crystal display device according to claim 23, wherein the liquid crystal domains are arranged regularly.

32. A liquid crystal display device according to claim 24, wherein the liquid crystal domains are arranged regularly.

33. A liquid crystal display device according to claim 25, wherein the liquid crystal domains are arranged regularly.

34. A liquid crystal display device according to claim 26, wherein the liquid crystal domains are arranged regularly.

35. A liquid crystal display device according to claim 23, further including a liquid crystal alignment layer provided on a surface of at least one of the plates, the surface facing the liquid crystal domains.

36. A liquid crystal display device according to claim 24, further including a liquid crystal alignment layer provided on a surface of at least one of the plates, the surface facing the liquid crystal domains.

37. A liquid crystal display device according to claim 25, further including a liquid crystal alignment layer provided on a surface of at least one of the plates, the surface facing the liquid crystal domains.

38. A liquid crystal display device according to claim 26, further including a liquid crystal alignment layer provide on a surface of at least one of the plates, the surface facing the liquid crystal domains.

39. A liquid crystal display device according to claim 23, wherein liquid crystal molecules in the liquid crystal domains are oriented in one of a twisted nematic manner, a super twisted nematic manner, an electrically controlled birefringence manner, and a ferroelectric liquid crystal manner.

40. A liquid crystal display device according to claim 24, wherein liquid crystal molecules in the liquid crystal domains are oriented in one of a twisted nematic manner, a super twisted nematic manner, an electrically controlled birefringence manner, and a ferroelectric liquid crystal manner.

41. A liquid crystal display device according to claim 25, wherein liquid crystal molecules in the liquid crystal domains are oriented in one of a twisted nematic manner, a super twisted nematic manner, an electrically controlled birefringence manner, and a ferroelectric liquid crystal manner.

42. A liquid crystal display device according to claim 26, wherein liquid crystal molecules in the liquid crystal domains are oriented in one of a twisted nematic manner, a super twisted nematic manner, an electrically controlled birefringence manner, and a ferroelectric liquid crystal manner.

43. A liquid crystal display device according to claim 23, wherein the liquid crystal domains are each provided for one pixel area which is a minimum unit for display.

44. A liquid crystal display device according to claim 24, wherein the liquid crystal domains are each provided for one pixel area which is a minimum unit for display.

45. A liquid crystal display device according to claim 25, wherein the liquid crystal domains are each provided for one pixel area which is a minimum unit for display.

46. A liquid crystal display device according to claim 26, wherein the liquid crystal domains are each provided for one pixel area which is a minimum unit for display.

* * * * *